Figure 1:
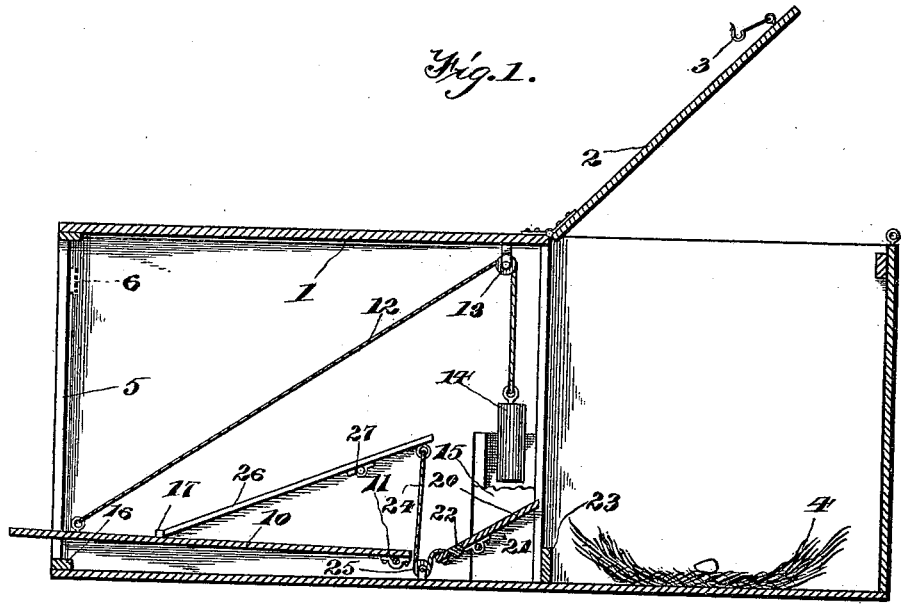

No. 622,407. Patented Apr. 4, 1899.
A. D. WORLEY.
HEN'S NEST.
(Application filed Apr. 30, 1898.)
(No Model.)

Witnesses:
H. W. Thayer.
J. H. Jochum Jr.

Arthur D. Worley, Inventor,
by Collamer & Co.,
Attorneys.

UNITED STATES PATENT OFFICE.

ARTHUR D. WORLEY, OF IRON HILL, MARYLAND.

HEN'S NEST.

SPECIFICATION forming part of Letters Patent No. 622,407, dated April 4, 1899.

Application filed April 30, 1898. Serial No. 679,299. (No model.)

*To all whom it may concern:*

Be it known that I, ARTHUR D. WORLEY, a citizen of the United States, and a resident of Iron Hill, Cecil county, State of Maryland, have invented certain new and useful Improvements in Hens' Nests; and my preferred manner of carrying out the invention is set forth in the following full, clear, and exact description, terminating with claims particularly specifying the novelty.

This invention relates to the care of live stock, and more especially to that class of devices therein known as "articles of poultry culture;" and the object of the same is to produce an improved hen's nest whereof the inlet stands at all times closed while the hen is on the nest, and other fowls cannot enter to annoy her or lay additional eggs under the setting hen. Heretofore it has been common in devices of this character to make the nest itself movable, so that the weight of the hen through intermediate mechanism would cause the closing of the inlet; but this was objectionable for the reason that the fowls were often frightened by the movement of the nest, and were always timid about laying in or setting on a movable nest, and because any sudden movement of the nest was liable to crack the eggs or destroy the germ therein. Heretofore, also, it has been common in some cases to provide the nest-box with a swinging door, with a catch to hold it in closed position, and to employ a tilting platform movable by the weight of the hen and connected by mechanism with the catch, so as to release the door at proper movements. My present invention contemplates an improvement on all such devices in that it avoids the objectionable features thereof; and to this end the invention consists in the provision of two tilting platforms connected by a catch, both being operated by the weight of the hen, and in other details of construction, all as hereinafter more fully described, and as illustrated in the drawings, wherein—

Figure 2:
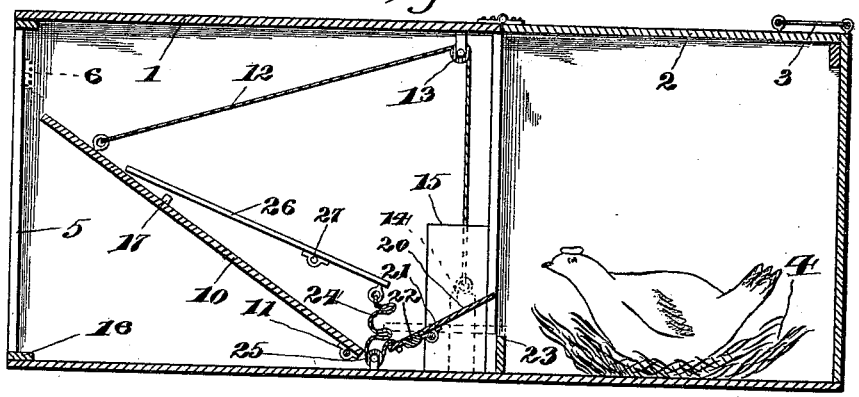

Figure 1 is a longitudinal section of this nest in position for the entrance of the fowl. Fig. 2 is a similar section with the hen on the nest and the other parts in a position the reverse from that shown in Fig. 1.

Referring to the said drawings, 1 is the casing, preferably rectangular, of wood or other suitable material, and 2 is a hinged door in its upper side, possibly held closed by means of a hook and eye 3. At the rear portion of the interior of this casing is a nest 4, stationary therein, although it can be arranged on a removable base, if desired, for the purpose of change of the nesting material, cleaning, &c. The front end of the casing is open, as at 5, although transverse slats might be employed, as seen at 6 in dotted lines, for the purpose of reducing the size of this opening, so as to prevent the admission of small fowls, such as bantams.

10 is a platform extending transversely the full width of the interior of the casing and hinged to its bottom, as at 11, and 12 is a cord or chain leading from the free front end of this platform over a pulley 13 and downward to a weight 14, preferably mounted in a suitable weight-chamber 15, so as to be out of sight and free from interruption in its movements. Although one weight and cord will suffice, I preferably employ two—one at each side of the casing. The front end of the platform is of sufficient length to rest upon the threshold 16 at the mouth 5 of the casing when it is depressed, and the weight 14 has sufficient strength and movement to raise the front end of the platform, as seen in Fig. 2, so as to prevent the admission of fowls at that time, even very small fowls, if the slat or slats 6 are employed. On the upper side of the platform, near its edges, are stops 17.

In rear of the platform and also extending transversely across the interior of the casing is a narrow board, acting as a lever 20, for which purpose it is pivoted, as at 21, its forward portion being weighted, as at 22, and its rearward edge preferably standing over a cleat 22.

24 is a cord or chain leading downward from the front edge of the lever 20, beneath a pulley or through an eye 25, and thence upward to the rear end of the short arm of a catch 26, which is pivoted, as at 27, between its extremities and whose long front arm engages the stop 17 on the platform 10 when the latter is depressed, as seen in Fig. 1. Here again there may be one of these catches, or two, and they stand adjacent the sides of the casing, so as to leave free and open the longitudinal passage-way therethrough.

In operation the parts of the device stand as seen in Fig. 1, a neat nest being built at 4, and possibly provided with a nest-egg. The hen enters at 5 and passes over the platform 10 for a considerable distance into the casing, there being then no action of parts and nothing which would frighten her in the least. Continuing, she steps or hops upon the lever 20 in rear of its pivot, and her weight causes this member to turn slightly from the position shown in Fig. 1 to that shown in dotted lines in Fig. 2 against the tendency of the weight 22. This draws on the cord or chain 24, turns the catch 26 over its pivot, and trips the free end of its long arm from behind the stop 17, and immediately the descent of the weight 14 draws on the cord or chain 12 and raises the platform 10 to the position seen in Fig. 2. It is clear that the only motion of the lever 20 is a slight rocking over its pivot, a trivial movement approximating the descent of any limb or bough on which a fowl would alight, and the considerable movement of parts necessary to close the inlet 5 occurs in her rear and only then by the rising of the platform to an oblique position, which substantially though not entirely closes the inlet. Experience has proven that this change of the position of parts will not scare the hen to any great extent, or, if it does frighten her at all, it only induces her to jump one step farther into the nest. The removal of her weight from the rear edge of the lever 20 permits it to resume its position, shown in full lines in Fig. 2, and this slackens the cord 24 without reëngaging the tip of the catch 26 behind the stop 17. While the hen is on the nest, others cannot enter, because the inlet is closed. After she has laid her egg she passes again over the lever 20, (which rocks slightly, as before described, but this time without effect,) and pursuing her way toward the light, which enters above the front edge of the platform, steps on the latter, which causes it to resume its substantially horizontal position, and passes out of the nest.

All parts are of the desired sizes, shapes, proportions, and materials, and considerable change in and addition to the specific details of construction may be made without departing from the principle of my invention.

What is claimed as new is—

1. In a hen's nest, the combination with the casing having a stationary nest in its rear portion, a platform hinged at its rear end across the bottom of the casing, a stop on its upper side, an upright weight-chamber at the side of the casing, a weight therein, and a cord leading thence over a pulley to the front end of the platform for normally raising the latter so as to close the inlet; of a lever standing entirely between the platform and nest and extending transversely across the casing, said lever having a slight rocking motion longitudinally of the casing, a pivoted catch engaging said stop on the platform when the latter is depressed, and connections between said catch and lever for tripping the former by the descent of the latter, as and for the purpose set forth.

2. In a hen's nest, the combination with the casing having a stationary nest in its rear portion, a tilting-platform mounted in the forward end of the casing and having a stop forward of its pivot, and means for causing this platform to stand normally in position to close the inlet; of a lever standing entirely in rear of the platform and pivoted between its front and rear portions so as to have a slight rocking motion, a weight on the lever forward of its pivot, a catch pivoted to the side of the casing with the tip of its long arm adapted to engage the stop on the platform when the latter is depressed, and a cord attached to its short arm and leading under a pulley to the weighted portion of said lever, as and for the purpose set forth.

3. In a hen's nest, the combination with a box-shaped casing open at its front and having a door in its top over its rear portion, a nest within the casing beneath said door, a transverse removable slat across the inlet of the casing near its top, a platform hinged at its rear edge to the bottom of the casing with its front edge adapted to coact with said slat to close the inlet against the admission of small fowls but to permit the ingress of light, a stop on the upper face of this platform, and a weight and cord for holding it normally raised; of a lever standing entirely in rear of the platform and pivoted between its front and rear portions so as to have a slight rocking motion, a catch pivoted to the side of the casing with the tip of its long and heavier arm adapted to engage the stop on the platform when the latter is depressed, and a cord attached to its short arm and leading under a pulley to the forward arm of said lever, as and for the purpose set forth.

In testimony whereof I have hereunto subscribed my signature on this the 28th day of April, A. D. 1898.

ARTHUR D. WORLEY.

Witnesses:
P. McDERMOTT,
PHILIP M. GROVES.